United States Patent [19]

Davis

[11] Patent Number: 4,882,049
[45] Date of Patent: Nov. 21, 1989

[54] APPARATUS FOR SHIFTING AND WASHING FILTER PLATES IN A FILTER PRESS

[75] Inventor: Steven S. Davis, Bountiful, Conn.

[73] Assignee: Baker Hughes, Incorporated, Salt Lake, Utah

[21] Appl. No.: 168,788

[22] Filed: Mar. 15, 1988

[51] Int. Cl.$^4$ .............................................. B01D 25/12
[52] U.S. Cl. .................................... 210/225; 134/144; 134/180; 134/198; 210/230; 210/231
[58] Field of Search ............... 210/224, 225, 227, 230, 210/231, 236; 92/88; 100/197, 198, 199; 134/144, 172, 180, 181, 198

[56] References Cited

U.S. PATENT DOCUMENTS

| | | | |
|---|---|---|---|
| 3,780,747 | 12/1973 | Stadie et al. | 210/225 |
| 4,107,042 | 8/1978 | Heinrich et al. | 210/225 |
| 4,129,137 | 12/1978 | Kurita et al. | 210/230 |
| 4,364,827 | 12/1982 | Guttman | 210/230 |
| 4,659,465 | 4/1987 | Makinoda | 210/225 |

*Primary Examiner*—Frank Spear
*Assistant Examiner*—Joseph Drodge

*Attorney, Agent, or Firm*—Skjerven, Morrill, MacPherson, Franklin & Friel

[57] ABSTRACT

An apparatus for effecting the separation of filter plates within a filter press for washing is disclosed. The apparatus includes a guide track having mounted thereon a slidably reciprocal carriage. The carriage includes multiple pivoted pawls having an abutment surface defined thereon for contacting a filter plate to be transported. The pawl is held in a raised orientation by a resilient spring means. The carriage is driven along the guide track by a pressure displaced piston in a rodless cylinder or tubular member. Positioned within the tubular member are two pressure chambers, one on each end of the piston. Pressurized fluid is controlled introduced into one or the other of those chambers to effect a displacement of the piston. A pair of shifter carriages are provided at the top of and parallel to the filter stack. A plate washer includes a vertical pair of rodless cylinders connecting a pair of vertically movable cross-bars, each cross-bar mounting a series of wash spray nozzles. The spray unit is moved up and down to wash the plates. The washer is connectable to the shifter carriages such that a stacked sullied plate can be moved to a wash position as each washed plate is pushed to a cleaned plate stack.

10 Claims, 4 Drawing Sheets

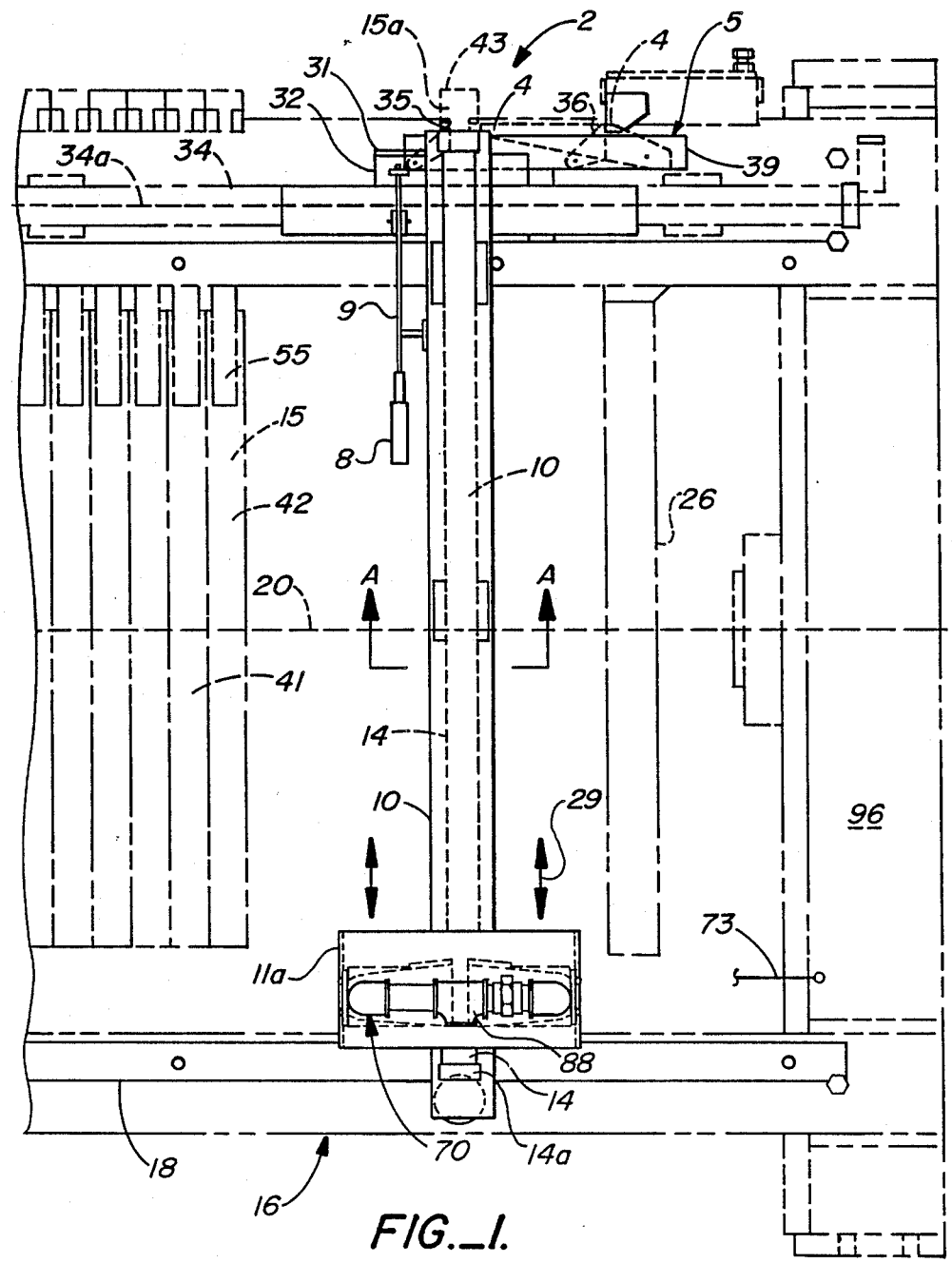
FIG._1.

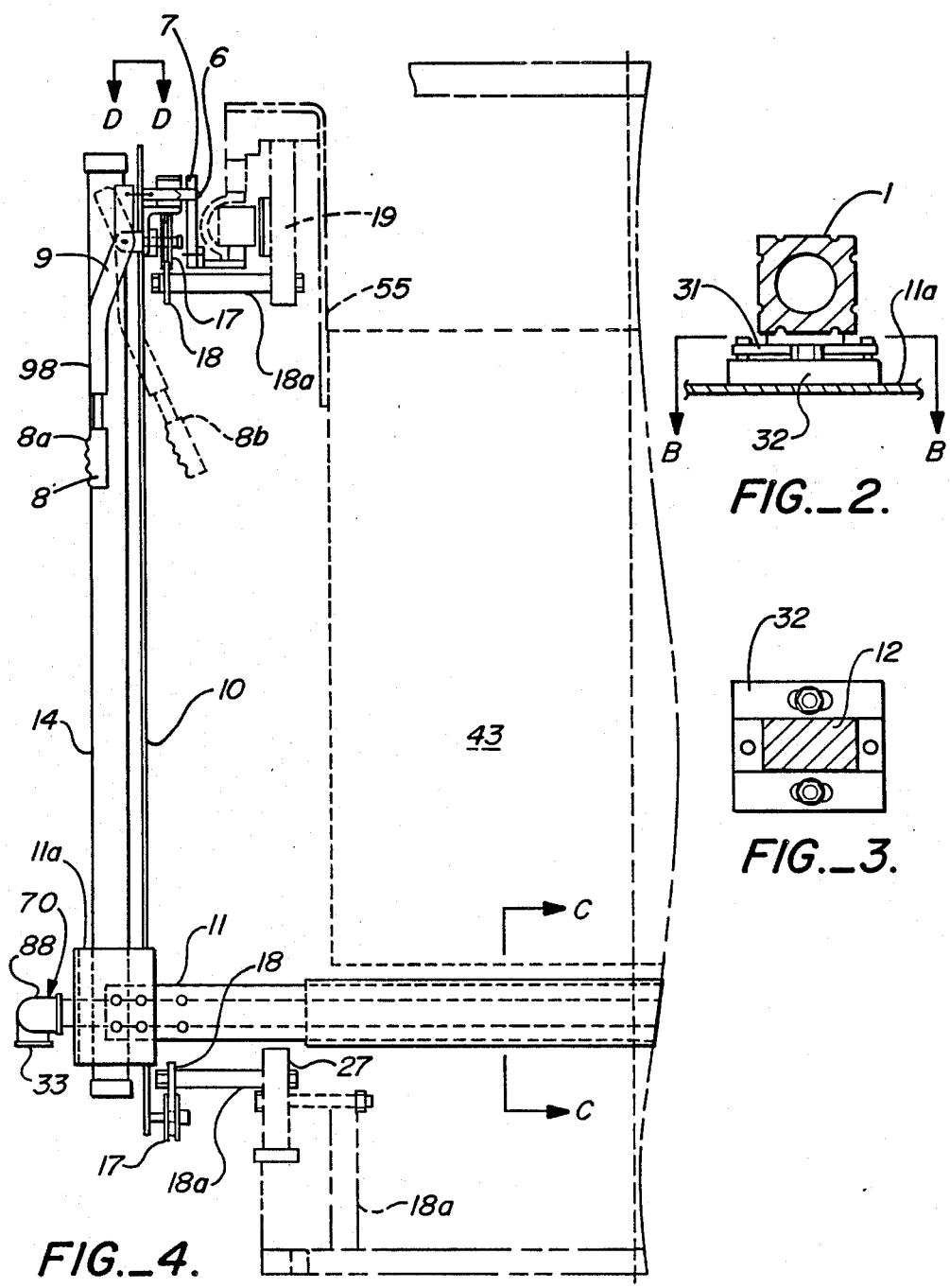
FIG._2.
FIG._3.
FIG._4.

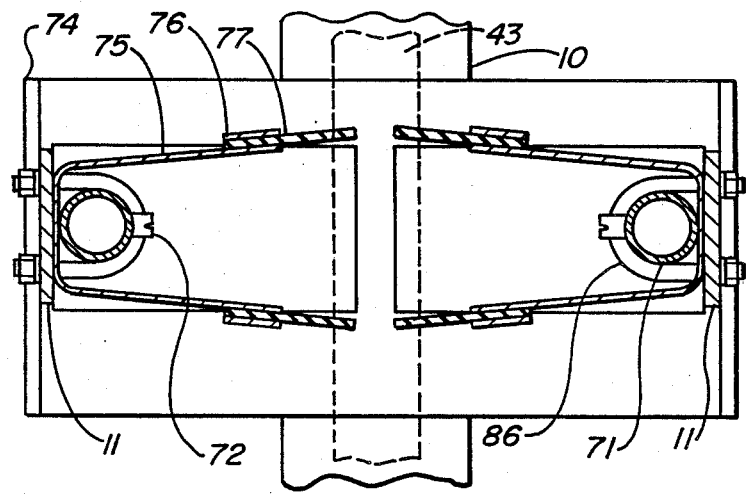
FIG._5.
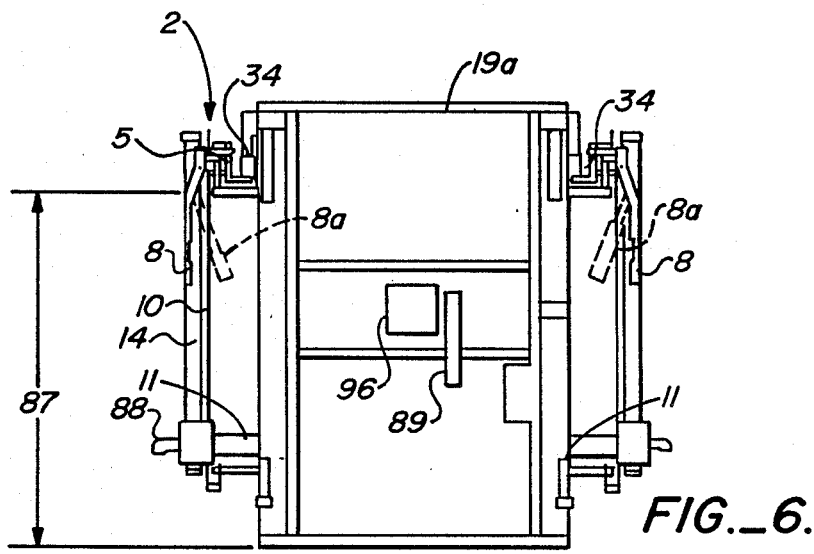
FIG._6.
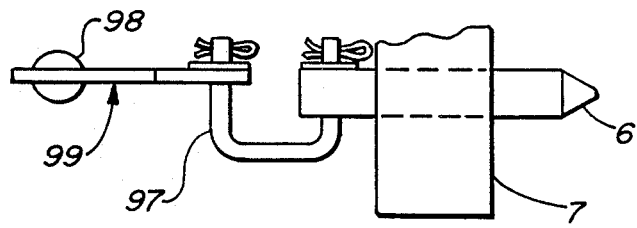
FIG._7.

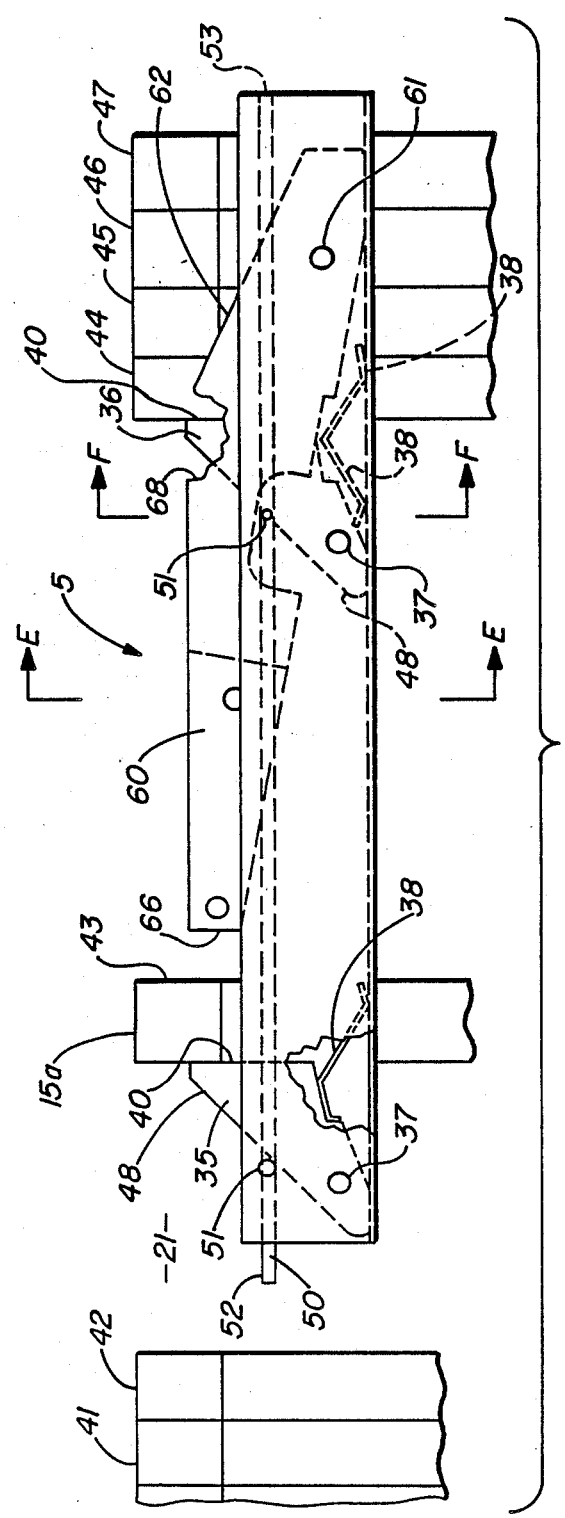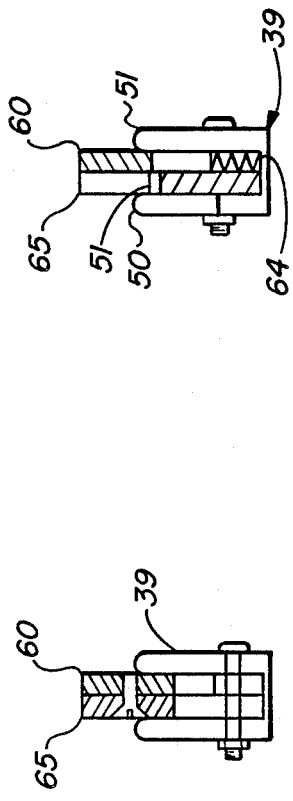

APPARATUS FOR SHIFTING AND WASHING FILTER PLATES IN A FILTER PRESS

RELATED APPLICATION

This application is an improvement to the invention set forth in U.S. patent application Ser. No. 936,091, filed Nov. 28, 1986, and assigned to the assignee of this application. The disclosure of said U.S. Ser. No. 936,091 is incorporated herein by reference.

BACKGROUND OF THE INVENTION

1. Field of the Invention

This invention relates to filter presses, specifically presses having a plurality of filter plates adapted for removing or separating solids from liquids. More particularly, this invention is directed to apparatus for separating the filter plates within a filter press, for removal of filter cake from plate filter cloths and for washing the filter cloths in situ on the filter plate.

2. Statement of the Art

The type of apparatus, known generally as a filter press, is well known in the art. These apparatus are used in various industries to separate solids from liquids. Filter presses may be used to separate solids from suspensions, slurries, and similar aqueous feed streams. Filter presses find application in a variety of chemical and metallurgical industries, e.g. sewage sludge treatment and ore dressing operations.

A filter press generally includes a plurality of separable plates. These plates are slidably held on a frame structure between a fixed support and an opposing moveable support. This moveable support is actuated typically by a hydraulic ram.

The plates are typically arranged in parallel about a horizontal axis. Each plate includes a depression on its side surface. Positioned over that depression is a filter cloth or fabric. Upon the plates being positioned adjacent one another, the opposing depressions in adjacent plates form a cavity wherein the filter cloth is suspended. In order to effect filtering, the plates are compressed one against another and against a fixed end support on the filter by a horizontally mounted hydraulic ram and press head acting against a follower plate. The compression of the plates, one against another, serves to form a sealed abutment of each plate against its neighboring plates. Thereafter, the fluid or solution, to be processed, may be injected into the plates and through the various cavities defined by the adjacent filter plates. Since the feed stream is fed under pressure into the enclosed cavities, the pressure of the feed stream forces the liquid through the filter cloths. The solids within the stream are embedded on the filter cloths as the liquid passes through the cloths.

When the filtering operation is complete, the hydraulic ram is retracted, the plates separated one-by-one, and the cake forced off the filter cloth by pressurized air admitted to the filter plate interior.

As the filtering plates filter the aqueous feed stream, an increasing quantity of solid material is built up upon the surface of the filter cloths. After reaching a certain quantity, these solid deposits or cakes preclude operation or use of the filter. In order to continue use of the filter press, the filter plates must be separated one from another and the cakes or solid deposits removed from the filter cloths.

Subsequently, it is desirable to wash the filter cloths in situ. This has been done commercially in various shifters by providing a washer unit which travels on an overhead beam and trolley system that can be designed to service a series of presses. As the washer unit moves along an overhead beam, the spray head is in retracted position. When the press is opened and the movable head, or follower, has been rolled back to provide an opening between the first two plates, the washer unit is activated. The spray head descends and then rises between the two plates that form the first chamber, spraying as it moves. The filter cloths covering the two opposing plates are subjected to high-pressure water spray from 24 to 40 nozzles. The travel speed of the spray head is adjustable.

After the spray head has been retracted, the washer unit travels along the overhead beam until it is in position to service the second chamber In automatic operation, the movement of the washer unit is synchronized with the action of the plate mover as it opens chamber after chamber. In semi-automatic operation, the action of the washer unit is pendant controlled.

In such washer unit, a pair of long vertical guide rods are attached to a spray head and are guided through apertures in a cross member movable along the fixed overhead beam. In a retracted position, the rods and spray head are moved to a position above the plates so that it can be moved between a different set of plates for a subsequent cleaning cycle. Spray water piping comprises a pair of elongated bellows-like tubing which is compressed in retracted position and is expanded as the spray head moves downwardly to spray each lateral increment of facing fabric cloths. The above construction is exemplified in the Shriver Scourshower washer.

Other filter cloth washers have been constructed in which a spray head washes both sides of one plate at the same time with the spray bar being lowered and raised by cables wound on and wound off a top horizontal cable drum.

The means and method of separating the filter plates one from another to facilitate the cleaning of the filter cloths is a problem which has confronted the industry for many years.

Various attempts have been made in the past to devise automated separation systems for use in separating the plates in the filter press after filtration has been effected. Representative of some of these attempts are those which are described in U.S. Pat. No. 4,102,788 (Broad), U.S. Pat. No. 4,359,385 (Krivec), U.S. Pat. No. 3,915,863 (Busse, et al.), U.S. Pat. No. 3,232,435 (Fismer), U.S. Pat. No. 4,272,376 (Schotten), U.S. Pat. No. 4,132,647 (Sakuma) and U.S. Pat. No. 4,105,560 (Fismer). In the related application, rodless cylinders extend horizontally along the bottom sides of the filter press frame and in combination with a pawl subsystem, provide for opening of the plates, movement of a sullied plate, i.e. a plate having its fabric media soiled by residual filter cake, an air blow discharge of the filter cake from each plate, and movement of the plate from which cake has been discharged to a follower. After all the plates have had their cake discharged, the follower is activated and the stack of plates returned to abutment with each other for start of a subsequent filter cycle of a feed slurry.

SUMMARY OF THE INVENTION

The instant invention is directed for use in a filter press having a elongated frame and a plurality of filter plates mounted to be slidable along a pair of horizontal rodless cylinders or frame extending along the top of the filter frame, i.e. along the longitudinal axis of the frame. The plates are hung from and are slidable on a stationary guide rail or guide track.

The automatic filter plate shifter of the invention includes a guide track which is positioned proximate the opposite top edges of the filter plates. The guide track is oriented to be substantially parallel to the longitudinal path of the filter plates within the press. Slidably amounted on that guide track is a carriage which is adapted to reciprocate on the track, move along that track in both a forward and backward direction, i.e. in fixed increments, for example, about 50 cm, along substantially the filter's full length The carriage includes a first pawl, which is positionable on that carriage in two orientations or conditions. In its first orientation or condition, the pawl is raised above the surface of the carriage. In its second orientation, the pawl is positioned substantially lower than its first orientation. The pawl in some instances may actually be positioned below the uppermost surface of the carriage itself. The pawl is pivotally mounted to the carriage so as to be reciprocal between the first and second orientations. A resilient support means which is mounted on the carriage and associated with the pawl urges that pawl into its first, i.e. raised, orientation.

The first sullied plate pick-up pawl includes an abutment surface (1) which is pulled slidingly on a plate handle bottom surface and which pivots to catch a far-side edge of the plate at the pawl head, and (2) which pulls the plate laterally in the pick-up pawl's raised condition to a washing position. The pawl is spring biased so that it pivots upwardly to catch the far side of each successive plate. As the carriage is displaced in a first direction the caught abutment surface transfers the momentum of the carriage against the filter plate and thereby serves to pull the filter plate effecting a corresponding displacement of that plate to the wash position. As the first pawl sliding surface contacts a sullied filter plate, the contact effects a shifting of the first pawl from its raised to its lower condition. In this lowered condition the abutment surface is substantially held out of pick-up contact with the filter plate. The sliding surface permits the pawl to be displaced in a direction beyond a filter plate or plate(s) in its lowered condition. Once past the plates, the pawl is returned to its raised orientation. The direction of the pawl's travel may then be reversed, i.e. to the first direction bringing the abutment surface into contact with the filter plate. A further displacement of the carriage/pawl assembly effects a displacement of the filter plate in the direction of movement of the carriage pawl assembly.

Simultaneous, a second push pawl is spring-pressed outwardly to catch a corresponding side edge of a washed plate at the wash position so that movement of the carriage and first pawl pulling a sullied plate simultaneously moves the washed plate in the direction of the follower plate to stack each washed plate in seriatim against the follower plate, Once the stroke of the carriage is completed, the wash cycle is commenced if the washer mechanism has been interconnected to the carriage. If the overall opening between the next sullied plate in the filter stack and the last-to-be washed plate which has been stacked against the follower is twenty inches, then a sullied plate is moved ten inches to the wash position and a washed plate moved ten inches to the follower stack. Upon completion of a wash cycle(s), the carriage shuttles in the opposite direction with the second pawl being pivoted into a "down" position so that it can move underneath a washed plate at the washed position as the first pawl shuttles back to pick-up the next sullied plate in the filter plate stack. The second pawl is then raised after it passes the washed plate so as to be in position to push that washed plate to the follower when the first pawl has picked up the next-in-line sullied plate.

In preferred constructions, the pivot mountings of both the first and the second pawl permit the rotation of the pawl about an axis which is substantially horizontal. Further, that rotational axis is oriented to be substantially perpendicular to the longitudinal axis of the filter press frame. The pawls rotate in a vertical plane which is parallel to the longitudinal axis of the carriage and the longitudinal axis of the frame as well as parallel to the direction of travel of the carriage along the guide track. Similar to the first pawl, the second pawl also includes a resilient support means associated therewith which is adapted to urge the second pawl into its first or raised orientation.

As seen in the related application, the carriage is mechanically associated with a drive means. Preferably this drive means is a piston, which piston is reciprocally mounted within a tubular member of a rodless cylinder. The tubular member is connected to the frame of the filter press. The tubular member includes a sidewall which extends longitudinally along the length of the filter press frame. The tubular member defines two oppositely-positioned pressure chambers within the hollow interior of that tubular member. A drive piston is positioned between those pressure chambers. As the pressure is varied within those two pressure chambers the piston is displaced within the tubular member, the displacement or reciprocation of the piston effects a corresponding displacement of the carriage along the guide track.

The tubular member defines a slot-like aperture which extends along its length. A bracket mounts the piston to the carriage member and is slidably fitted into the slot. The tubular member is fitted with a means of successively sealing the slot during the movement of the piston within the tubular member. This sealing permits the pressurization of the two opposing pressure chambers and effects the displacement of the piston within the tubular member.

The introduction of pressurized fluid into either of the pressure chambers, defined within the tubular member, is manipulated by a control system as shown in the related application. This control system operates to channel pressurized fluid to effect a displacement of the carriage in either direction.

Once the abutment surface of the first pawl is brought into an abutment against the filter plate the abutment effects an introduction of the filter plate into that space between the two opposing pawls. Since that filter plate is adjacent a neighboring series of plates, which themselves are abutted against a firmly positioned support the continued channeling of the pressurized fluid to the pressure chamber serves to augment the pressure within that chamber, without any corresponding displacement of the filter plate. As the pressure within the pressure chamber builds and surpasses a preselected value, the control system introduces pressurized fluid into the second or opposing pressure chamber within the tubular member. The pressurized fluid in the former or first pressure chamber is vented. The introduction of pressurized fluid into the second pressure chamber effects a displacement of the carriage in a direction opposite to that effected by the pressurization of the first pressure chamber.

The arrangement of the pawls effects a releasable union of the pawls with respective filter plates upon the abutment of those pawls with the filter plates.

The carriage through means of the piston is driven by a sufficient force to displace the filter plate along a first direction opposite to that induced by pressurized fluid channeled into the first pressure chamber.

The above operation is repeated successively for each filter plate until the entire plurality of plates is transferred from their loaded or compressed location to their open configuration for washing and then to the opposing end of the filter press frame for stacking washed plates against the follower plate.

The guide tracks of the invention may be positioned adjacent to the filter plates, i.e., along the sides of the filter plates, so as to extend substantially parallel along the longitudinal axis of the filter press. The tracks may be positioned above the stacked array of filter plates while at the same time extending substantially parallel to the longitudinal axis of the filter press. In preferred constructions, the guide track together with its associated carriage and drive means is positioned on each side of the filter plate so as to form a joint transport means to convey the plates from one location to the other.

The present invention provides a vertically movable filter cloth washer which utilizes the above described plate shifter for horizontal travel. The washer will be "parked" between the follower plate and press head during normal press operations. For plate washing, the follower plate is retracted and the washer is manually locked into the shifter carriage. By pendant switch, the carriage with washer attached picks up the first sullied plate from the compressed stack by action of the first pick-up pawl and moves that sullied plate to a washing position. The washing cycle is started automatically or by operation of up/down pendant switch buttons. When washing is complete, the shifter carriage is automatically moved or moved by pendant switch operation to pick up the next plate while the second pawl slips under the handle of a washed plate. Simultaneous with the first pick-up pawl pulling a sullied plate to the wash position, a previously washed plate at that wash position is pushed to the follower stack by a second pawl. The chamber stack is isolated from all mechanical components and thus poses no threat of contamination. The washer uses vertically mounted rodless pneumatic cylinders of the same type as the shifter, which does not require appreciable overhead clearance space above the filter press and overhead beam required by the prior art movable guide rods of the Shriver washer previously described. A vertically movable horizontally positioned water spray nozzle array is movable in juxtaposition to the sullied faces of the filter plate so that water impinges on the fabric filter cloth and removes the residual cake from the plate filter cloths.

BRIEF DESCRIPTION OF THE DRAWINGS

FIG. 1 is a side elevational partial view of a filter plate stack with an engaged washer.

FIG. 2 is a horizontal cross-sectional view of the washer cylinders taken on the line A—A of FIG. 1.

FIG. 3 is a vertical cross-sectional view of the piston mounting bracket taken on the line B—B of FIG. 2.

FIG. 4 is an end view of one side of the washer as engaged with the shifter.

FIG. 5 is a side cross-sectional view of the crossbar, splash guard, and water spray nozzle array taken on the line C—C of FIG. 4.

FIG. 6 is an end view of the shifter showing the washer as extending behind the plate filter follower plate.

FIG. 7 is a top view of the interlock mechanism for the washer-shifter taken on the line D—D of FIG. 4.

FIG. 8 is a side elevation view of the shifter carriage assembly.

FIG. 9 is a sectional view taken on lines E—E of FIG. 8.

FIG. 10 is a sectional view taken on the lines F—F of FIG. 8.

DETAILED DESCRIPTION OF THE DRAWINGS

A filter press of the type to which the instant invention may be fitted, includes a plurality of filter plates arranged along a generally elongated frame. The filter plates are slidable along the length of the frame in a direction substantially parallel to the longitudinal axis of the frame. The plates are held in position by a fixed head plate or support which extends vertically and forms a barrier precluding further displacement of the plates. A moveable follower is positioned substantially opposite the head plate on the frame. The follower is moveable along tracks of the frame by the action of a hydraulic ram. The ram is extendable to move against the moveable follower which impacts against the assemblage of filter plates eventually pushing or compressing those plates against the head plate. The compression of the various plates into an assembly forms a compacted array which is held together in a sealed relationship by the pushing action of ram. This sealed array provides means of introducing solids-laden liquids into that filter plate assemblage for purposes of filtering the solids from the liquids.

In the present invention as seen in FIG. 1, a series of filter plates 15 are shown mounted laterally across a pair of horizontally extending side rails or guide track 34 forming part of a filter frame 16. The guide track is a generally elongate member having a longitudinal axis 34a substantially parallel to axis 20 of frame 16.

Mounted on the track 34 in a sliding relationship thereto is a carriage 5 which is shown in detail in FIGS. 8-10. In its preferred embodiment, the guide tracks are a rodless cylinder of the type shown in the related application where the carriage is supported by a bracket attached through a slot to the piston movable in the cylinder.

The carriage 5 is a generally elongated body which extends along a longitudinal axis and includes a U-shaped pawl box 39 formed by two parallelly and spacedly positioned upright planar panels and a planar base.

Positioned pivotedly within the structure of carriage 5 are a pair of pawls: a first pawl 39, and a second pawl 36. Both pawl 35 and pawl 36 are held within the pawl box 39 by a respective pivot pin 37 (FIG. 8). Each pin 37 extends from one upright panel through a respective pawl and is mounted within the opposing upright panel to form a generally horizontally positioned rotational axis for the pawl Each pin 37 facilitates the reciprocation of its pawl in a generally vertical plane.

As shown in FIG. 8, a flat spring 38 has one end which is mounted upon the base of the pawl box 39. The spring extends upright therefrom to be received within a recess well of the pawls. In its uncompressed position, the spring functions to urge the pawls into a raised orientation whereat the pawl has an abutment surface which extends above the uppermost surface level of the carriage 5 sufficiently to engage and retain or push a filter plate 15. The pawl is also positionable in a lowered orientation such that the pawl is positioned sufficiently low that it does not engage and retain or push a filter plate 43.

FIGS. 1 and 5 illustrate the positioning of a filter washer 2 so that it can (simultaneous) wash both faces of a filter plate 43. Plate 43 is positioned at a wash position by the action of pawl 35 extending from the shifter carriage 5. A guide block 32 and retainer plate 31 is attached to the piston of the horizontal rodless cylinders and function to receive the washer. Washer 2 is interconnected to a bracket 7 of shifter carriage 5 by a locking pin 6. Engagement and disengagement of locking pin 6 from the carriage is by operation of pin-locking handle 8 between positions 8a and 8b (FIG. 4) through handle extension 98 and connecting links 9. A vertical rodless cylinder 10 extends on each side of the filter plate stack as seen in FIG. 6. A cross-bar 11 is attached to the rodless cylinder piston through the guide block 32 and retainer plate 31. The cross-bar supports a series of water spray nozzles extending across the bar. Cross-bar 11 is affixed to the movable piston by cross-bar support 11a.

FIG. 2 shows the fixed connection of rodless cylinder 10, more particularly the piston thereof, through guide block 32 and plate 31. FIG. 3 shows the cross-section of the guide block and the connector 12 extending to the piston in the cylinder.

As seen in FIG. 4, the washer 2 includes rotatable wheels or rollers 17 which ride on fixed tracks 18 supported by overhead beam 19 and a bottom filter frame structure 18a. This allows the washer to be moved along the horizontal plate stack, when disconnected from the carriage, to a "home" or "parked" position between the filter follower 26 and filter cylinder bracket 96 (FIG. 1), while filtering press and normal cake removal operations are taking place. Washer 2 also rides on the top rails along with the shifter carriage when it is engaged therewith in the "plate wash" operational steps.

In filter plate wash operations, the follower is retracted and the washer 2 is moved horizontally and manually locked into the shifter carriage 5 by locking pin 6. By pendant switch or by automatic programming the shifter with washer attached picks a first plate 43 from the compacted stack of sullied plates and moves the plate to a wash position as shown where it is spaced from adjacent plates sufficiently to allow access of the washer cross-bar and nozzle assembly (FIG. 5) vertically therethrough. Vertical movement of the cross-bar 11 and affixed spray nozzles 72 is accomplished by movement of the piston (and affixed guide block) vertically in a vertical rodless cylinder of the type seen in FIGS. 9 and 10 of the related application. This effects washing simultaneously over both sides of plate 43. Other arrangements can be provided for washing only one side of a plate in a filler plate having only one effective side. A hose connection 33 is provided for affixing water hoses (not shown) to a wash water connection 88 of the wash pipe assembly 70. Arrows 29 represent the up and down movement of the wash pipe assembly 70. The nozzles are aligned along the cross-bar and wash pipe 71 so that edges of the spray fan do not impinge on each other. Care should be taken to set the rodless cylinder position so as to maintain sufficient clearance (such as 0.25 inches) between the cross-bar 11 and the lower side-bar 18 of the plate filter.

Subsequently, when washing of a plate 43 is completed, the shifter with the washer attached is automatically moved or moved by pendant switch operation to pick up the next plate 42 to be washed by pawl 35 while indexing pawl 36 slips under the previously washed plate, is spring pressed to the raised position, and pushes the washed plate 43 to the follower stack of plates as the next sullied or caked plate 42 is brought into washing position. The carriage thus acts in shuttle-like movement moving a plate left-to-right from a completed plate stack to a wash position and then to the loose follower stack of plates. Sullied wash water containing the cake remnants from the filter cloths is collected by a suitable catch basin (not shown) under the plate washing position. It is to be noted that the wash position changes longitudinally since it normally is halfway between the last washed plate and the next-to-be washed sullied plate in the original compressed stack 41,42, etc.

FIG. 5 details the wash head of the invention wherein horizontal wash pipes 71, preferably extending over a width greater than or equal the effective filtering width of the filter plates, includes a series of spray nozzles 72 in each pipe extending therefrom across a width generally corresponding to the width of the plates. In one embodiment, 15 nozzles are placed over the cross-bar span of each pipe to spray wash water on each side of the filter cloths on the filter plate. Pipes 71 are held on cross-bars 11 attached to support bracket 74 by U-bolts 86. Splash guards 75 extend from under pipes 71 and a flexible rubber skirt seal 77 provided for directing wash water directly on opposed plate cloth surfaces. Retainer seals 76 seal the skirt seals to the splash guards 75. Plate 43 is positioned for cleaning between the array of nozzles.

In FIG. 6, the washer 2 is seen straddling the plate filter including frame top beam 19a. The washer is shown in a "washing" position behind the press cylinder 96. The cross-bar 11 with its associated wash pipe and nozzles are movable over an approximate vertical distance 87. Hydraulic hoses 89 connect the filter plate compression, piston to a remote power unit (not shown). Safety lanyards 73 may extend from both sides of the press cylinder 96 to the opposed head bracket 22 of the filter.

FIG. 7 illustrates the linkage 99 extending from handle extension 98 through a connecting link 97 to operate locking pin 6 into and out of engagement with an aperture in the shifter carriage bracket 7.

As seen in FIG. 8, the pawls are a generally elongated triangular body having a generally quadrilateral cross section. Each pawl has a proximal end which is proximate the pivot mounting of the pawl. The distal end includes a generally planar surface abutment face 40. The abutment face is oriented generally transverse to the longitudinal axis of the pawls. The pawls include a smooth planar sliding surface 48. This surface 48 is held in a generally angulated orientation with respect to the longitudinal axis when the pawl is in its lowered position. The surface 48 is brought into contact with the handles 15a of the filter plates 15 as the pawl is displaced toward the closed side of the filter press, as indicated by plates 41, 42 at the left of FIGS. 1 and 8. Upon the surface 48 contacting one of those handles 15a, the handle forces the end of the pawl 35 downward, permitting the carriage to continue onward. Once the surface 48 clears the handle 15a, the end of the pawl including surface 48 is forced upward by spring 38 into that groove 21 between the adjacent handles 15a as seen in FIG. 1. In this position, the abutment face 40 is in abutment against the side of handle 15a.

Spacedly positioned opposite pawl 35 is a second pawl 36 Pawl 36 is generally the same shape as pawl 35. The plane of abutment face 40 is oriented substantially perpendicular to a longitudinal axis of the pawl box. Pawl 36 functions to be pushed into a lower position as it moves with pawl 35 towards the closed stack of plates 41, 42 passing slidingly underneath a washed plate 43 positioned at the wash position. After the pawl 36 has cleared the plate 43, the pawl 35 has passed into the groove 21 of the next plate 42 of the closed stack. Pawl 36 then, by spring action, pivots to its raised position so that its abutment face 40 abuts the left side of plate 43 at its groove 21, such that upon opposite directional movement of the carriage 5, pawl 36 pushes plate 43 to the follower stack of plates 44, 45, 46, and 47 and other plates from the wash position in seriatim as the cycle is repeated.

Positioned within the pawl box of the carriages is a pair of axial shaft-like cylindrical members 50 which function as pawl levers. The rods 50 are positioned parallel to one another and spacedly apart. Positioned between the ends of each rod 50 is a cross rod 51 which extends from one rod 50 to the oppositely positioned rod 50. As shown, the end rod 50 extends outwardly from the end of the carriage 5. The cross rod 51 is positioned in a predetermined relationship with the pawls 35, 36. When the extended end 52 of rod 50 strikes the head end of the filter press (after all plates 42, 41, etc. have been washed and shifted to the follower plate), such action pushes the rod 50 to the right. The crossbars 51 then strike the slope of the pawls 35, 36 pivoting both pawls down to the depressed position allowing the whole carriage and depressed pawls to pass under the handles of all the plates in the follower stack so that the washer can return to its parked position and be disconnected to allow a new plate filtering cycle. When the other then extended end 53 of the rods hits the follower plate, rod 50 moves to the left and releases the crossbars 51 from the pawls 35, 36 allowing them to be spring pressed to the raised position.

A third pawl member 60, known as a pawl follower or "dog-leg" pawl, is pivotable about pivot pin 61 held in the sides of the pawl box 39. When a slope 62 of pawl follower 60 strikes the bottom of the handles of the stack follower plates 44, 45, 46, 47, etc., the follower pawl is depressed against a coil spring 64 positioned under the bottom edge of the pawl follower and resting on the base of the pawl box 39 (FIG. 10). A pawl insert 65 is attached to pawl follower 60. The end 66 of the insert and pawl follower acts as a stop allowing pawl 35 to pick up only one plate 42 by striking the front of the handle of plate 42 above the groove in the handle after the pawl follower has passed under washed plate 43 in its depressed position. In the return direction, the slope 62 of the pawl follower strikes the washed plate which depresses the follower pawl so it is in a depressed position to allow it to pass under the next washed plate as the carriage returns to the wash position and, after plate washing, advances to the next plate 41 for pick up with the depressed follower passing under the previously washed plate. The top of the follower is shown cutaway at 68 to allow a showing of the edge 40 of pawl 36 against washed plate 44 just before reversal of the carriage to pick up the next sullied plate 42.

The carriage horizontal drive means of the filter and the vertical drive means of the invention for the washer nozzle array may include a fluid pressure cylinder defined by a generally cylindrical tubular sidewall. The sidewall defines a hollow interior cavity or channel. The sidewall of each cylinder defines a slot-like aperture which extends substantially the entire length of the sidewall. Fitted within a circular channel of the cylinder is a cylindrically configured piston dimensioned and configured to be reciprocally slidable within the channel. Positioned on each end of the cylinder is a plate which in conjunction with the cylinder sidewall and end plates 14a (FIG. 1) define a pair of pressure chambers. Each pressure chamber is substantially sealed (not shown) with the exception of a slot defined by the side wall. A sealing strip is provided as in the related application to be inserted within the slot to form a seal of that slot whereby each pressure chamber is sealed air tight, permitting a pressurization of that chamber Air supply conduits (not shown) each access a respective pressure chamber and provide a means whereby pressurized air may either be introduced into the chamber or alternately withdrawn from the chamber.

A piston is fitted within the cylinder of a carriage/piston support passing through the slot to connect the cylindrical piston to the carriage 5. Any displacement of piston results in a corresponding and equal displacement of the carriage. The piston fitted tubular member, commonly denominated a "rodless cylinder," is presently available commercially under the trade designation "Lintra" marketed by Martonair, Inc. of Agawam, Mass. and as seen in U.S. Pat. No. 4,545,290 (Lieberman). The specification of that patent is incorporated herein by reference. The top of the rodless cylinder may form a guide track upon which the carriage 5 may slide. Alternate constructions of a rodless cylinder for use in the instant invention are disclosed in the related application.

Other rodless cylinders which may be used in the instant invention are those sold commercially under the trade designations Tran-sair System manufactured by Mosier Industries, Inc. of Brookville, Ohio; Series 2000 manufactured by Orija Corp. of Elmhurst, Ill.; and Band Cylinders manufactured by Tolomatic of Minneapolis, Minn.

The filter plates are supported and slidable on top rails 19a wherein handle portions of the pates slide on the rails. The filter plates are hung by strips 55 attached to the outer edge or face edges of each filter plate. Follower plate 26 is seen in FIG. 1. As distinguished from the related application, the carriage will have a longer stroke in providing for the wash operation. On each cycle, the carriage will shift half the open distance between the next sullied plate and the last washed plate which has been moved to the follower position. The washer can be programmed or hand operated to perform one, two or more washes of a single plate. The invention also contemplates multiple wash arrays which can wash multiple spaced plates at the same time.

Those skilled in the art will recognized that the embodiments herein and discussed are illustrative of the general principals of the invention. The embodiments herein described are not intended to limit the scope of the claims which themselves recite what applicant regards as his invention.

I claim:

1. A filter press comprising:
elongated frame;
a press head and follower mounted on an end of said elongated frame;
a fixed support mounted on an opposing end of said elongated frame;
a plurality of filter plates slidably supported on said elongated frame between said follower and said support, said filter plates becoming a plurality of sullied filter plates during a filtering operation;
a shifter carriage mounted on said elongated frame;
means mounted on said carriage for releasing one of a stack of said plurality of sullied filter plates and for moving said released one plate and carriage along said elongated frame;
a plate washer;
means for intermittently attaching said plate washer to said shifter carriage, such that said shifter carriage and said plate releasing means moves said sullied filter plates in seriatim to a plate washing position to be washed by said attached plate washer; and
wherein the means for releasing includes a first indexing pawl for picking up a sullied plate and moving the sullied plate to the plate washing position.

2. The filter press of claim 2 including a second indexing pawl for pushing a washed plate to a follower stack of washed plates adjacent said follower while said first indexing pawl moves another sullied plate in seriatim to said washing position.

3. A filter press comprising:
elongated frame;
a press head and follower mounted on an end of said elongated frame;
a fixed support mounted on an opposing end of said elongated frame;
a plurality of filter plates slidably supported on said elongated frame between said follower and said support, said filter plates becoming a plurality of sullied filter plates during a filtering operation;
a shifter carriage mounted on said elongated frame;
means mounted on said carriage for releasing one of a stack of said plurality of sullied filter plates and for moving said released one plate and carriage along said elongated frame;
a plate washer;
means for intermittently attaching said plate washer to said shifter carriage, such that said shifter carriage and said plate releasing means moves said sullied filter plates in seriatim to a plate washing position to be washed by said attached plate washer; and
wherein said plate washer is parked between said follower and said press head during normal press filtering operation and said washer is disconnected from said carriage and wherein said plate washer includes an array of spray nozzles movable vertically by at least one vertical rodless cylinder mounted to said elongated frame.

4. A filter press comprising:
elongated frame;
a press head and follower mounted on an end of said elongated frame;
a fixed support mounted on an opposing end of said elongated frame;
a plurality of filter plates slidably supported on said elongated frame between said follower and said support, said filter plates becoming a plurality of sullied filter plates during a filtering operation;
a shifter carriage mounted on said elongated frame;
means mounted on said carriage for releasing one of a stack of said plurality of sullied filter plates and for moving said released one plate and carriage along said elongated frame;
a plate washer;
means for intermittently attaching said plate washer to said shifter carriage, such that said shifter carriage and said plate releasing means moves said sullied filter plates in seriatim to a plate washing position to be washed by said attached plate washer;
wherein said washer comprises:
a pair of spaced vertical rodless cylinders spaced from either side of said elongated frame and said stack of plates;
a cross-bar including a plurality of spray nozzles extending across said elongated frame and having a length approximating the width of said filter plates;
means for connecting said cross-bar to a piston in each of said rodless cylinders; and
wherein operation of said pistons in said rodless cylinders moves said cross-bar and plurality of nozzles vertically to wash a filter plate facing surface.

5. The filter press of claim 4 including a pair of cross-bars, each including a plurality of nozzles, said cross-bars being spaced from each other such that the cross-bars simultaneously move vertically to wash opposed vertical surfaces of a filter plate.

6. The filter press of claim 5 including splash guards extending from cross-bars to direct wash water flow from said spray nozzles to said filter plate surfaces.

7. A filter press comprising:
elongated frame;
a press head and follower mounted on an end of said elongated frame;
a fixed support mounted on an opposing end of said elongated frame;
a plurality of filter plates slidably supported on said elongated frame between said follower and said support, said filter plates becoming a plurality of sullied filter plates during a filtering operation;
a shifter carriage mounted on said elongated frame;
means mounted on said carriage for releasing one of a stack of said plurality of sullied filter plates and for moving said released one plate and carriage along said elongated frame;
a plate washer;
means for intermittently attaching said plate washer to said shifter carriage, such that said shifter carriage and said plate releasing means moves said sullied filter plates in seriatim to a plate washing position to be washed by said attached plate washer; and
wherein said means for attaching said plate washer to said shifter carriage includes a locking handle, a locking pin, an interconnect linkage between said pin and said handle, an apertured lock bracket attached to said shifter carriage, and wherein operation of said handle moves said locking pin into or out of said aperture of said lock bracket to connect or disconnect said plate washer from said shifter carriage.

8. A filter press comprising:
elongated frame;

a press head and follower mounted on an end of said elongated frame;

a fixed support mounted on an opposing end of said elongated frame;

a plurality of filter plates slidably supported on said elongated frame between said follower and said support, said filter plates becoming a plurality of sullied filter plates during a filtering operation;

a shifter carriage mounted on said elongated frame;

means mounted on said carriage for releasing one of a stack of said plurality of sullied filter plates and for moving said released one plate and carriage along said elongated frame;

a plate washer;

means for intermittently attaching said plate washer to said shifter carriage, such that said shifter carriage and said plate releasing means moves said sullied filter plates in seriatim to a plate washing position to be washed by said attached plate washer;

wherein said carriage comprises:

a pawl box;

a first pawl pivotable in said box and operable to engage and pick up a sullied plate;

a second pawl longitudinally-spaced from said first pawl and pivotable in said box to engage and push a washed plate to a follower stack simultaneously with movement of said sullied plate by said first pawl to a washing position approximately mid-way between a next sullied plate in said plurality of sullied plates;

a third pawl pivotable in said box and longitudinally extending from said first pawl toward and past said second pawl, said third pawl having a sloped cam surface operable to engage a portion of a stacked group of washed plates to depress said third pawl so as to permit said third pawl to pass a plate at a wash position;

spring means for raising said first and second pawls into a raised position to engage, respectively, a sullied and washed plate; and spring means for raising said third pawl to a raised position so as to impact a sullied plate in said plurality of stacked plates and prevent said first pawl from picking up other than a first sullied plate facing said wash position.

9. The filter press of claim 8 further comprising means in said pawl box for depressing said first and second pawls when all of said plurality of sullied plates has been moved to said wash position whereby said carriage is movable without interference by washed plates to a park position of said carriage between said press head and follower whereat said washer is disconnectable from said carriage.

10. The filter press of claim 9 wherein said means for depressing includes a pair of horizontal rods extending from said pawl box; a pair of cross rods spacedly attached across said horizontal rods and each juxtaposed to cam surfaces on said first and second pawls, respectively; and wherein movement of said horizontal rods moves said cross rods along said cam surfaces to depress said cams to a position whereby said carriage is freely movable past washed plates in said follower stack.

* * * * *